United States Patent
Butterbaugh et al.

(10) Patent No.: US 6,291,006 B1
(45) Date of Patent: Sep. 18, 2001

(54) DISSOLUTION AGENT AND PROCESS FOR MAKING RAPIDLY SOLUBLE INSTANT BEVERAGE PRODUCTS

(75) Inventors: Jeffrey Lee Butterbaugh, Cincinnati; Jeffrey Alan Sargent, West Chester, both of OH (US)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

(21) Appl. No.: 09/364,846

(22) Filed: Jul. 30, 1999

(51) Int. Cl.⁷ ....................................................... A23F 5/00
(52) U.S. Cl. ........................ 426/594; 426/285; 426/654; 426/590
(58) Field of Search .................................. 426/594, 654, 426/590, 285

(56) References Cited

U.S. PATENT DOCUMENTS

| | | | |
|---|---|---|---|
| 3,958,033 | * | 5/1976 | Sims et al. . |
| 4,242,364 | * | 12/1980 | Buddemeyer et al. . |
| 4,310,561 | * | 1/1982 | Buddemeyer et al. . |
| 4,460,617 | * | 7/1984 | Barndt et al. . |
| 4,950,140 | * | 8/1990 | Pflaumer et al. . |
| 5,424,085 | * | 6/1995 | Hsieh et al. . |
| 5,741,538 | * | 4/1998 | Stipp et al. . |

FOREIGN PATENT DOCUMENTS

402016959  *  1/1990  (JP) .

* cited by examiner

*Primary Examiner*—Anthony J. Weier
(74) *Attorney, Agent, or Firm*—Erich D. Hemm; Carl J. Roof

(57) ABSTRACT

A novel dissolution agent, and its use in the manufacture of instant (flavored and unflavored) beverage products, (coffee, hot chocolate, teas, creamy juice drinks, milk shakes, nutritional drinks, and the like, especially instant coffee products), that have improved mouthfeel ("creaminess", "richness", "body", "complexity", "body-richness", "substantial") and thickness, without "sliminess" or "stringiness". This novel dissolution agent may also be used to make a binder solution that will be used during manufacturing in the agglomeration process. The instant beverage products made according to the present invention, (especially preferred are instant coffee products), can deliver a creamy, rich, preferably foamy, beverage with a clean, improved mouthfeel and thickness without "sliminess" or "stringiness", as well as a higher flavor impact, at a lower dosage of solids (5–10%, preferably 6.5–8.5%, and more preferably 7.5%).

17 Claims, No Drawings

DISSOLUTION AGENT AND PROCESS FOR MAKING RAPIDLY SOLUBLE INSTANT BEVERAGE PRODUCTS

FIELD OF THE INVENTION

The present invention relates to a novel dissolution agent which is suitable for use in the manufacture of instant beverage products. The present invention also relates to a process for making instant beverage products using the novel dissolution agent described herein.

BACKGROUND OF THE INVENTION

Current dry mixes used to prepare many instant beverages, especially instant flavored coffee beverages, typically comprise a mixture of non-dairy creamers, sweeteners, soluble beverage components (e.g. instant coffee products use soluble coffee) and flavors. See, for example, U.S. Pat. No. 5,433,962 (Stipp). Consumers usually prepare flavored instant beverages using, on average, 7.5% solids, and generally in the range of 5%–10% solids. Unfortunately, at a 5–10% dosage of solids, instant beverages prepared from current dry mixes are perceived as thin and watery and do not develop any foamy/frothy head. They also lack the creamy mouthfeel, richness, flavor impact and sweetness that is desired by consumers of such products.

Creamy beverages, generally, and creamy coffee beverages, in particular, typically rely on finely dispersed fat (i.e., homogenized fat) to deliver mouthfeel. This emulsified fat can be delivered by liquid or spray dried non-dairy creamers, whole milk, or low fat milk. However, the fat found at normal levels in current flavored coffee beverages provides insufficient mouthfeel benefits. These mouthfeel benefits can be improved by increasing the level of fat. However, increasing the level of fat creates other issues such as stability of the fat against oxidative reactions, the development of off-flavors, and the potential instability of the emulsion of the non-dairy creamer. Further, since non-dairy creamers typically contain only 35 to 50% fat, delivering increased mouthfeel can require significantly higher volumes or dosages of powdered products. This makes these powdered products less useful, for the consumer, as spoonable executions.

Typically, an instant beverage product contains a mechanical mixture of beverage solids (e.g., instant coffee particles), creamer base, sweetener base, and, if desired, flavorings. Unfortunately, the rate of solubility of these individual components differs, such that the desired ratios of the components do not completely dissolve. For example, the creamer base typically comprises a fatty component and is therefore hydrophobic. As a result, the creamer tends to dissolve less completely or less rapidly as compared to the other components. This, in turn, leaves aesthetically unappealing clumps of undissolved particles floating on the top of the beverage or as sediment in the bottom of the drinking vessel. This hydrophobic property is also characteristic of other fatty materials, such as chocolate, whole milk solids, whole cream solids and flavor oils, frequently included in instant beverage products, particularly flavored instant coffee beverages. Other problems associated with current instant beverage products, particularly flavored instant coffee beverages, include segregation of low and high density particles in the dry mix. Such segregation results in non-uniform ingredient composition between spoonfuls of dry product. This non-uniformity is particularly prevalent in products sweetened with an artificial sweetener.

While vigorous shaking and stirring of such an instant beverage solution may eventually result in a completely dissolved product, this is unsatisfactory for the consumer. The characterization of "instant" should connote ease of preparation, such as little to no stirring, yet result in a readily dissolved product.

Based on the foregoing, there is a need for an instant beverage product, particularly a creamy, rich, flavored instant coffee product, that is readily and uniformly soluble. It is therefore an object of the present invention to provide an instant beverage product, particularly a flavored instant coffee product, that is more readily and uniformly soluble as compared to flavored instant coffee products wherein the creamer and sweetener components occur as individual particles in the dry product. It is a further object of this invention to provide a more dense product via agglomeration than results when using the steam agglomeration process described by Stipp in U.S. Pat. No. 5,433,962, realizing density achieved in agglomeration is formula dependent. The product made as described herein is more dense and allows the consumer to use less scoops or teaspoons of finished product, yet retains a creamy mouthfeel. It is a further object of this invention to provide a novel dissolution agent to be used in the binder solution used in the agglomeration process.

SUMMARY OF THE INVENTION

The present invention relates to a novel dissolution agent, and its use in the manufacture of instant (flavored and unflavored) beverage products, (coffee, hot chocolate, teas, creamy juice drinks, milk shakes, nutritional drinks, and the like, especially instant coffee products), that have improved mouthfeel ("creaminess", "richness", "body", "complexity", "body-richness", "substantial") and thickness, without "sliminess" or "stringiness".

The present invention also relates to the use of a novel dissolution agent to make a binder solution that will be used during manufacturing in the agglomeration process. The instant beverage products made according to the present invention, (especially preferred are instant coffee products), can deliver a creamy, rich, preferably foamy, beverage with a clean, improved mouthfeel and thickness without "sliminess" or "stringiness", as well as a higher flavor impact, at a lower dosage of solids (5–10%, preferably 6.5–8.5%, and more preferably 7.5%).

The method for making the flavored instant beverage products of the present invention involves the use of a special blend of emulsifiers as a dissolution agent. Said dissolution agent preferably includes lecithin, propylene glycol, ethoxylated mono and diglycerides, and a sucrose fatty acid ester, combined with maltodextrin and water to make a binder solution. The dissolution agent is used at about 0.20% to about 0.33%, preferably about 0.27%, dry basis of the finished product. The ethoxylated mono and diglycerides, the lecithin, and the propylene glycol together comprise from about 0.1% to about 0.3%, preferably about 0.2%, dry basis of finished product. The lower sucrose fatty acid ester is from about 0.01% to about 0.04%, preferably about 0.02%, dry basis of fmished product. During the manufacture of the instant beverage product, a binder solution is prepared using the dissolution agent and is preferably sprayed onto a previously mixed flavored instant beverage product base, preferably in a high intensity agglomerator (for example, a Schugi type agglomerator). The particle size is increased and the binder solution with the dissolution agent is preferably added as the particles are formed so the dissolution agent is thoroughly mixed inside of the newly formed granule.

DETAILED DESCRIPTION OF THE INVENTION

A. Definitions

"Agglomeration" refers to the preparation of relatively larger particles by combining a number of relatively smaller particles into a single unit. Processes for accomplishing agglomeration are more fully discussed below. It is preferred to use a high intensity agglomerator for the process of the present invention.

"Dissolution agent," as used herein, refers to a blend of food grade emulsifiers that, when added to the binder solution used in the agglomeration process, results in an instant beverage product which readily dissolves when mixed with water or other suitable liquid. Said dissolution agent aids in dispersion and ultimate dissolution in water of the particles used to make the instant beverage product As used herein, the term "lecithin" includes conventional lecithins, acetylated lecithins, and other suitable lecithin or lecithin-like compounds such as de-oiled lecithin, lysolecithins, phosphatidic acid and its salts, lysophosphatidic acid and its salts, and phospholated monoglycerides and any mixture thereof.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentearytiritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

"Lower polyol fatty acid esters" means polyols having no more than 3 fatty acid ester groups.

"IBP" means instant beverage product.

"Bulk density" refers to the overall density of a plurality of particles measured in the manner described on pp. 127–131 of COFFEE PROCESSING TECHNOLOGY, Avi Publishing Company, Westport, Conn., 1963, Vol. II.

As used herein, the terms "instant beverage" and "soluble beverage" are used interchangeably to refer to beverage products such as instant or soluble coffee products that are relatively soluble in water, especially hot water, and are typically mixed with an aqueous liquid or diluent, i.e., water, milk or other aqueous medium, to provide a ready-to-serve or ready-to drink beverage. These products are sold to the consumer by the manufacturer in a dry mix, powder, concentrate, or emulsion form and are prepared by the consumer, according to directions, at or near the time of serving and/or consumption.

The terms "moisture" and "water" are used interchangeably herein.

The term "creamer" as used herein refers to an additive used in many ready-to-drink and instant beverage products. Commercial creamers are readily available, and are readily chosen by those of ordinary skill in the art. Prepared creamers generally comprise fat, emulsifiers, and processing aids; accordingly, the beverage compositions of the present inventions utilize creamers and, depending on the composition of the particular creamer chosen, the all or part of the fat, emulsifier or processing aids used in the composition are, in fact, contributed by the creamer.

Suitable creamers for use in the flavored beverage products of the present invention include dairy and non-airy creamers. Suitable dairy creamers include whole milk solids; butterfat solids; low-fat dry milk; and dry mixes used to prepare ice cream, milkshakes, and frozen desserts, as well as mixtures of these dairy creamers. Suitable non-dairy creamers can be made from a variety of fats and oils including soybean and partially-hydrogenated soybean oil, partially-hydrogenated canola oil, hydrogenated and partially-hydrogenated coconut oil, as well as other partially- or fully-hydrogenated vegetable oils, or combinations of such oils. Preferred creamers include non-dairy creamers made from vegetable oils, emulsifiers, co-emulsifiers, carbohydrates, sodium caseinate, and buffers. Additional creamers suitable for use in the present invention include those synthetic and imitation dairy products disclosed in SKIRK-OTHMER ENCYCLOPEDIA OF CHEMICAL TECHNOLOGY, W. J. Harper, Willey Interscience, 3rd edition, Vol. 22, section entitled "Synthetic and Imitation Dairy Products," pp. 465–498, (1978), which is hereby incorporated by reference herein.

Both foaming and non-foaming creamers can be used in the flavored beverage products of the present invention. Foaming creamers suitable for use in the present invention can comprise a non-dairy fat (e.g., partially hydrogenated oil), a water-soluble non-airy carbohydrate (e.g., sucrose, dextrose, maltose, corn syrup solids and mixtures thereof), a buffer, a proteinaceous foam stabilizing agent (e.g., sodium caseinate) and optionally a gum thickener. These solid components are mixed with water and then homogenized. A gas (e.g., nitrogen) is injected or blended into this mixture and the mixture spray-dried to provide the foaming creamer. See U.S. Pat. No. 4,438,147 (Hedrick, Jr.), issued Mar. 20, 1984; and U.S. Pat. No. 5,462,759 (Westerbeek et al), issued Oct. 31, 1995, both hereby incorporated by reference herein. Non-foaming creamers suitable for use in the present invention have an ingredient composition similar to that of the foaming creamers but without the incorporated gas. Also, foaming creamers typically have more proteinaceous components (typically about 12–13% of total ingredients) relative to non-foaming non-airy creamers (typically about 3.5% of total ingredients).

The term "soluble beverage component" as used herein means those water-soluble components which are used to flavor and/or texturize the beverage products of the present invention and could consist of coffee, tea, juice and/or milk, and can be readily chosen by one of ordinary skill in the art. The soluble beverage component can be in various forms including, but not limited to powders, emulsions, concentrates, or extracts, or any mixture thereof.

All particle sizes referred to herein are based on the U.S. Standard Sieve Screen Series. See page 701 of Sivetz & Desrosier, COFFEE TECHNOLOGY (Avi Publishing Co. 1979).

As used herein, the term "foam" refers to a light frothy mass formed in or on the surface of the coffee beverage (generally coffee or hot chocolate). "Foam" is generally achieved utilizing a fine dispersion of gas in a liquid to form said mass on the beverage surface.

As used herein, the term "comprising" means various components and processing steps can be conjointly employed in the beverage products and process for preparing these products according to the present invention. Accordingly, the term "comprising" encompasses the more restrictive terms "consisting essentially of" and "consisting of."

"Sweetener base" refers to a sweetener or sweeteners useful for sweetening a beverage. Such sweeteners include natural and artificial sweeteners. Such natural sweeteners useful in the IBP and process of the present invention include, but are not limited to, sucrose, fructose, dextrose, maltose, lactose, or mixtures thereof. Such artificial sweeteners include, but are not limited to saccharin, cyclamates, acetosulfam K (Sunette.TM.), L-aspartyl-L-phenylalanine lower alkyl ester sweeteners (e.g. Aspartame.TM.); L-aspartyl-D-alanine amides disclosed in U.S. Pat. No. 4,411,925 to Brennan et al.; L-aspartyl-D-serine amides disclosed in U.S. Pat. No. 4,399,163 to Brennan et al.; L-aspartyl-L-1-hydroxymethylalkaneamide sweeteners disclosed in U.S. Pat. No. 4,338,346 to Brand; L-aspartyl-l-hydroxyethyaLaneamide sweeteners disclosed in U.S. Pat. No. 4,423,029 to Rizzi; and L-aspartyl-D-phenylglycine ester and amide sweeteners disclosed in European Patent Application 168,112 to J. M. Janusz, published Jan. 15, 1986; and the like and mixtures thereof.

"Flavor base" refers to a component of the IBP of the present invention comprising instant coffee and flavorings; preferably the flavor base does not include sweeteners or creamers.

The beverage solids (e.g., instant coffee particles) used in the process of the present invention can be prepared by any convenient process (discussed in more detail below), particularly for instant coffee. The instant coffee component can be any one of the commercially available instant coffees sold on the market, or combinations thereof. These include spray dried instant coffee powders, agglomerates and freeze-died chunks. The coffee may be any single variety of coffee or a blend of different varieties. The coffee may be decaffeinated or undecaffeinated. The coffee may be processed to reflect a unique flavor characteristic such as expresso, French roast, or the like. Preferably, the IBP of the present invention comprises from about 3% to about 25%, by weight of instant coffee; more preferably from about 5% to about 20%; more preferably still, from about 6% to about 15%.

The flavorings useful in the IBP of the present invention include any one of the commercially available flavorings. Preferably, such flavorings are sourced from encapsulated or liquid flavorings. The flavorings may be natural or artificial in origin. Preferred flavorings include, but are not limited to, Almond Nut, Amaraetto, Anisette, Brandy, Cappuccino Chocolate, Chocolate Mint, Cinnamon, Cinnamon Almond, Creme de Menthe, Grand Mariner, Irish Creme, Kahlua, Macadamnia Nut, Orange, Orange Leaf, Peppermint Stick, Pistachio, Raspberry, Sambuca, and Vanilla bean. Actual levels of flavoring added will depend upon the strength of flavor desired. Such levels are readily determined by one skilled in the art. Preferably, the IBP of the present invention comprises from about 0.1% to about 10%, by weight of flavoring(s); more preferably from about 0.1% to about 5%; more preferably still, from about 0.1% to about 3%.

"cps" means centipoise.

"Mesh" refers to the number of apertures per square inch of a screen or sieve; i.e., it is the square of the number of strands of metal or plastic per linear inch. All references to mesh size herein refer to US Standard Sieve Series.

"PSD" means particle size distribution as defined on pp. 137–140 of COFFEE PROCESSING TECHNOLOGY, Avi Publishing Company, Westport, Conn., 1963, Vol II.

"psig" means pounds per square inch gauge.

All amounts, parts, ratios and percentages used herein are by weight unless otherwise specified.

B. Novel Dissolution Agent

The novel dissolution agent of the present invention should preferably be used during the agglomeration process. The novel dissolution agent may also be used in the sizing step, or during the mixing step that follows the sizing step.

The novel dissolution agent includes from about 50% to about 80%, preferably from about 60(% to about 70% lecithin; from about 3% to about 20%, preferably from about 5% to about 15% propylene glycol from about 5% to about 25%, preferably from about 10% to about 20% ethoxylated mono and diglycerides, and any mixture thereof; and from about 3% to about 20%, preferably from about 5% to about 15% of a sucrose fatty acid ester. The dissolution agent is at about 0.20 to about 0.33%, preferably about 0.27%, dry basis of the finished product. The ethoxylated mono and diglycerides, the lecithin, and the propylene glycol together comprise from about 0.1% to about 0.3%, preferably about 0.2%, dry basis of finished product. The lower sucrose fatty acid esters is from about 0.01% to about 0.04%, preferably about 0.02% dry basis. The novel dissolution agent is preferably used to prepare a binder solution to be used in the manufacture of the instant beverage products, most preferably during the agglomeration step. Said binder solution preferably comprises from about 0.5% to about 15%, preferably from about 1% to about 10% lecithin; from about 0.05% to about 2%, preferably from about 0.1% to about 1.5% propylene glycol; from about 0.12% to about 3%, preferably from about 0.2% to about 2% ethoxylated mono and diglycerides; from about 0.05 to about 2.0%, preferably from 0.1% to about 1.5% of a lower polyol fatty acid ester; from about 20% to about 40% maltodextrin, corn syrup solids, sucrose, or any mixture thereof; and from about 60% to about 80% water.

In addition to being supplied as a blend of materials suitable for use as a dissolution agent, the ingredients disclosed herein can be added at various points in the manufacturing process (e.g., during the agglomeration process, during sizing and/or during mixing) to accomplish a final dry mix which is readily soluble in water. For example, a binder solution can be made by first making a dry pre-mix of sucrose monoester and maltodextrin. This dry pre-mix is then mixed with the binder water. Finally, the lecithin, ethoxylated polyglycerides and propylene glycol are added to the binder solution and dispersed.

C. Sources of Ingredients Used in Instant Beverage Products

Emulsifiers. Emulsifiers help to disperse fat in the beverage products of the present invention. Any food grade emulsifier suitable for inclusion in edible products can be used. Examples of suitable emulsifiers include mono- and di-glycerides of long chain fatty acids, preferably saturated fatty acids, and most preferably, stearic and palmitic acid mono- and di-glycerides. Propylene glycol esters are also useful in these edible mixes. Lecithin is an especially preferred emulsifier for use in the edible mixes and ready-to-serve beverages of the present invention. The emulsifier can be any food compatible emulsifier such as mono- and di-glycerides, lecithin, sucrose monoesters, polyglycerol esters, sorbitan esters, polyethoxylated glycerols and mixtures thereof. Up to about 3% and preferably from 0.1% to 3% stabilizer or emulsifier is used. Suitable emulsifiers are lactylated mono- and di-glycerides, propylene glycol monoesters, polyglycerol esters, sorbitan esters, diacetylated tartaric acid esters of mono- and di-glycerides, citric acid esters of monoglycerides, stearoyl-2-lactylates, polysorbates, succinylated monoglycerides, acetylated monoglycerides, ethoxylated monoglycerides, lecithin, sucrose monoester, and mixtures thereof. Suitable emulsifiers include Dimodan® O, Dimodan® PV, and Panodan® FDP, manufactured by Danisco Food Ingredients. The emulsifiers may be utilized with a co-emulsifier. Depending on the particular formulation chosen, suitable co-emulsifiers may be chosen from any food compatible co-emulsifier or emulsifier.

Soluble beverage component. The soluble beverage components are readily available to, and can be easily chosen by, one having ordinary skill in the art. Soluble beverage components can include coffee, tea, milk, and/or juice, any mixtures thereof. The soluble beverage components may be in liquid, solid concentrates, powder, extract, or emulsion form.

The preferred soluble beverage component for use in the flavored beverage products of the present invention is determined by the particular application of the product. For example, if the application is a coffee beverage, the soluble beverage component is, generally, coffee. For a tea or juice beverage product, the soluble beverage component is generally, tea or juice, respectively.

For example, the soluble coffee used in the coffee products of the present invention can be prepared by any convenient process. A variety of such processes are known to those skilled in the art. Typically, soluble coffee is prepared by roasting and grinding a blend of coffee beans, extracting the roast and ground coffee with water to form an aqueous coffee extract, and drying the extract to form instant coffee. Soluble coffee useful in the present invention is typically obtained by conventional spray drying processes. Representative spray drying processes that can provide suitable soluble coffee are disclosed in, for example, pages 382–513 of Sivetz & Foote, COFFEE PROCESSING TECHNOLOGY, Vol. I (Avi Publishing Co. 1963); U.S. Pat. No. 2,771,343 (Chase et al), issued Nov. 20, 1956; U.S. Pat. No. 2,750,998 (Moore), issued Jun. 19, 1956; and U.S. Pat. No. 2,469,553 (Hall), issued May 10, 1949, all of which are incorporated herein by reference. Other suitable processes for providing instant coffee for use in the present invention are disclosed in, for example, U.S. Pat. No. 3,436,227 (Bergeron et al), issued Apr. 1, 1969; U.S. Pat. No. 3,493,388 (Hair), issued Feb. 3, 1970; U.S. Pat. No. 3,615,669 (Hair et al), issued Oct. 26, 1971; U.S. Pat. No. 3,620,756, (Strobel et al), issued Nov. 16, 1971; U.S. Pat. No. 3,652,293 (Lombana et al), issued Mar. 28, 1972, all of which are incorporated herein by reference. In addition to spray dried instant coffee powders, instant coffee useful in the present invention can include freezedried coffee. The instant coffee can be prepared from any single variety of coffees or a blend of different varieties. The instant coffee can be decaffeinated or undecaffeinated and can be processed to reflect a unique flavor characteristic such as expresso, French roast, or the like.

Buffers. The flavored beverage products of the present invention utilize buffers, preferably stabilizing salts to improve the colloidal solubility of proteins and maintain the pH on the finished beverage of 6.2 to 7.0 for optimum stability and flavor. The disodium or dipotassium salts of citric acid or phosphoric acid are most commonly used. The use of phosphate salts is particularly desirable when the water used for the preparation of the beverage is high in calcium or magnesium.

Thickeners. Flavored beverage products according to the present invention can comprise thickening agents. These thickening agents include natural and synthetic gums, and natural and chemically modified starches. Suitable gums include locust bean gum, guar gum, gellan gum, xanthan gum, gum ghatti, modified gum ghatti, tragacanth gum, carrageenan, and/or anionic polymers derived from cellulose such as carboxymethylcellulose, sodium carboxymethylcellulose, as well as mixtures of these gums. Suitable starches include, but are not limited to, pregelatinized starch (corn, wheat, tapioca), pregelatinized high amylose content starch, pregelatinized hydrolyzed starches (maltodextrins, corn syrup solids), chemically modified starches such as pregelatinized substituted starches (e.g., octenyl succinate modified starches such as N-Creamer, N-Lite LP, TEXTRA, manufactured by National Starch), as well as mixtures of these starches. It is particularly preferred that thickening agents be predominantly made from starches and that no more than 20%, most preferably no more than 10%, of the thickener be made from gums. These thickening agents can also be incorporated into these flavored beverage products as part of the carrier for the emulsified fat on the spray dried non-foaming creamer.

Foam stabilizer. The flavored beverage products of the present invention can also include a proteinaceous foam stabilizer. Suitable proteinaceous foam stabilizers include egg white albumin (ovalbumin), whey protein, soy protein, soy protein isolate, corn protein isolate, as well as mixtures of these stabilizers. Dried egg white albumin is particularly preferred because of its ability to form better and more stable foams at relatively low concentrations. The other proteinaceous foam stabilizers (e.g., whey protein) are typically effective only at much higher concentrations than egg white albumin.

These proteinaceous foam stabilizers decrease the surface tension so as to form continuous films due to complex intermolecular interactions to prevent rupture of the foam bubbles. Basically, the foam stabilizer acts as a macromolecular surfactant that provides multiple "anchor" or contact points at the air-water interface of the foam bubbles that are generated when the products of the present invention are mixed with water to form the beverage. Proteins with rapid adsorption and unfolding at the air-water interface produce better foams than proteins that adsorb slowly and resist unfolding at the interface. Unfolding and the ability to form thicker and more cohesive films depends on the elasticity of the protein which is further related to the flexibility of the protein in the adsorbed layer, i.e., proteins that exhibit high elasticity have very low flexibility. The greater stability of foams where egg white is used is due to the high concentration of rigid globular proteins present that have higher flexibility (i.e., caused by disulfide bonds in protein). Egg white typically has at least 40 different globular glycoproteins with ovalbumin accounting for usually about 54% of these glycoproteins.

Acid. Flavored beverage products, especially flavored instant coffee products, according to the present invention also preferably comprise an edible water-soluble acid (organic or inorganic). Suitable acids include citric acid, malic acid, tartaric acid, fumaric acid, succinic acid, phosphoric acid, as well as mixtures of these acids. Carbonate/ Bicarbonate. Flavored beverage products according to the present invention may comprise an edible water-soluble carbonate or bicarbonate (or mixture thereof) salt that evolves carbon dioxide when it reacts with the acid. Suitable carbonate or bicarbonate salts include sodium bicarbonate, sodium carbonate, potassium bicarbonate, potassium bicarbonate, as well as any mixture thereof. Sodium carbonate and bicarbonate are especially preferred when used in combination with citric acid. The reaction between the sodium carbonatelbicarbonate with the citric acid forms sodium citrate that stabilizes sodium caseinate (e.g., from the foaming and non-foaming creamer) in solution when the instant beverage (e.g., coffee) product is reconstituted in harder water.

Sweeteners. Flavored beverage products according to the present invention can further comprise sweeteners. Preferred sweeteners for use in the present invention are sugars and sugar alcohols such as sucrose, fructose, dextrose, maltose, lactose, high fructose corn syrup solids, invert sugar, sugar alcohols, including sorbitol, as well as mixtures of these sugars and sugar alcohols. In order to deliver lower levels of solids per dosage, it is particularly preferred to use a higher intensity sweetener with the sugar or sugar alcohol. These higher intensity sweeteners include saccharin, cyclamates, acesulfame K (Sunette™), L-aspartyl-L-phenylalanine lower alkyl ester sweeteners (e.g., aspartame); L-aspartyl-D-alanine amides disclosed in U.S. Pat. No. 4,411,925 to Brennan et al.; L-aspartyl-D-serine amides disclosed in U.S. Pat. No. 4,399,163 to Brennan et al.; L-aspartyl-L-1-hydroxymethylalaneamide sweeteners disclosed in U.S. Pat. No. 4,338,346 to Brand; L-aspartyl-1-hydroxyethyalkaneamide sweeteners disclosed in U.S. Pat. No. 4,423,029 to Rizzi; and L-aspartyl-D-phenylglycine ester and amide sweeteners disclosed in European Patent Application 168,112 to J. M. Janusz, published Jan. 15, 1986.; and the like and mixtures thereof. A particularly preferred sweetener system is a combination of sucrose with aspartame and acesulfame K. This mixture not only enhances sweetness, but also lowers the level of solids that is delivered in preparing the beverage.

Milk Solids. Milk solids can also be included in the flavored beverage products, according to the present invention. These milk solids can be prepared by drying milk to produce a mixture of the proteins, minerals, whey and other components of milk in a dry form. These solids can include butterfat solids and cream powder but are preferably low-fat dry milk and non-fat milk solids, i.e., the solids derived from milk that has had the fat removed. Any commercial source of non-fat or other milk solids can be used. Dry mixes used to prepare ice cream, milk-shakes, and frozen desserts can also be included in these flavored beverage products. These dry mixes provide an especially creamy, rich mouthfeel to the coffee beverage prepared when the flavored instant coffee products of the present invention are mixed with water.

Processing Aids. Optional ingredients in the beverage products of the present invention are processing aids, including flow aids, anti-caking agents, dispersing aids, and the like. Particularly preferred are flow aids such as silicon dioxide and silica aluminates. Starches, aside from the thickening agents, can also be included to keep the various ingredients from caking.

Fat/Oil. The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially- or fully-hydrogenated or modified otherwise, as well as non-toxic fatty materials having properties similar to triglycerides, herein referred to as non-digestible fat, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEANrm. The terms "fat" or "oil" also refer 100% non-toxic fatty materials having properties similar to triglycerides. The terms "fat" or "oil" in general include fat-substitutes, which materials may be partially or fully nondigestible.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, penteayythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raff-mose, and maltotriose.

By higher "polyol fatty acid polyester" is meant a polyol having at least 4 fatty acid ester groups. (Lower polyol fatty acid esters contain 3 or less fatty acid ester groups are used in the novel dissolution agent of the present invention.) Lower polyol polyesters are generally digested in, and the products of digestion are absorbed from, the intestinal tract much in the manner of ordinary triglyceride fats or oils, whereas those higher polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The higher polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans-isomers, and can be the same for all ester groups, or can be mixtures of different fatty acids.

Liquid non-digestible oils can also be used in the practice of the present invention. Liquid non-digestible oils have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterified alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterified polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995, and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein. However the latter composition may provide more digestible fat.

The preferred non-digestible fats are fatty materials having properties similar to triglycerides such as sucrose polyesters. OLEAN,™ a preferred non-digestible fat, is made by The Procter and Gamble Cornpany. These preferred non-digestible fat or oil substitute compositions are described in Young; et al., U.S. Pat. No. 5,085,884, issued Feb. 4, 1992, and U.S. Pat. No. 5,422,131, issued Jun. 6, 1995 to Elsen et al.

Other ingredients known in the art may also be added to the edible fats and oils, including antioxidants such as TBHQ ascorbic acid, chelating agents such as citric acid, and anti-foaming agents such as dimethylpolysiloxane.

The edible fats and oils with the proper particle size distribution (from about 0.1 to about 3.0 microns) are frequently delivered via a creamer.

Microparticulate component. The microparticles which make up the microparticulate component useful in the flavored beverage products of the present invention have a substantially spheroidal shape and display fat-like mouthfeel characteristics when the particles have a mean diameter distribution in the range of from about 0.1 to about 3 microns, preferably with less than about 2% of the total number of particles over 3 microns. The particles are non-aggregated and exhibit a substantially smooth organoleptic character of an oil-in-water emulsion.

These microparticles can be prepared from a carbohydrate that can attain a substantially spheroidal or substantially round shape in the 0.1 to 3 micron diameter size range. These microparticles include, but are not limited to LITA®, a mixture of Zein protein and gum arabic, or mixtures thereof. See also, for example, U.S. Pat. No. 4,911,946 (Singer et al), issued Mar. 27, 1990; and U.S. Pat. No. 5,153,020 (Singer et al), issued Oct. 6, 1992, both of which are incorporated by reference. Suitable carbohydrates include starches, gums and/or cellulose, as well as mixtures thereof. The starches are typically modified by cross-linking to prevent excessive swelling of the starch granules using methods well-known to those skilled in the art. Other suitable carbohydrates include calcium alginate, cross-linked, dextran, gellan gum, curdlan, konjac mannan, chitin, schizophyllan and chitosan. Carbohydrates that do not have a natural round shape must be treated so that they attain a substantially spheroidal shape. This can be accomplished by making a solution of the carbohydrate and converting the solution to a gel quickly and uniformily (generally in a field of high shear-force) so that a narrow distribution of a gelled microparticles are formed having the above described diameters. Generally, a stream of carbohydrate solution will be introduced into a highly turbulent reaction zone where the gelled microparticles are formed. High speed mixing and shearing conditions can also be employed. Calcium alginate microparticles can be formed by making a solution of sodium alginate and introducing this solution into a calcium ion containing solution through e.g. an ultrasonic spray nozzle or any device producing droplets less than 3 microns in diameter. Gellan can be microparticulated by spray cooling a hot gellan solution via any device capable of producing droplets less than 3 microns resulting in the formation of spheriodally-shaped microparticles. Konjac mannan can be microparticulated by introducing a solution into a turbulent, heated, alkaline reaction zone. Once the carbohydrate microparticles are formed, they must be substantially non-aggregated and remain that way. Aggregate blocking agents, for example, lecithin and xanthan gum, can be added to the microparticles to stabilize the particles. See U.S. Pat. No. 4,734,287 (Singer et al), issued Mar. 29, 1988, which is incorporated by reference.

These microparticles can also be prepared from any protein that can attain a substantially spheroidal or substantially round shape in the 0.1 to 3 micron diameter size range. These microparticles include, but are not limited to, Simplessee 100® and DAIRY-LO® both of which are whey proteins, or mixtures thereof. See U.S. Pat. No. 4,734,287 (Singer et al), issued Mar. 29, 1988; and U.S. Pat. No. 4,961,953 (Singer et al), issued Jun. 16, 1989, both of which are incorporated by reference. Suitable protein sources for preparing such microparticles include egg and milk proteins, plant proteins (especially including oilseed proteins obtained from cotton, palm, rape, safflower, cocoa, sunflower, sesame, soy, peanut, and the like), and microbial proteins such as yeast proteins and the so-called "single cell" proteins. Preferred proteins include dairy whey protein (especially sweet dairy whey protein), and nondairy-whey proteins such as bovine serum albumin, egg white albumin, and vegetable whey proteins (i.e., non-airy whey protein) such as soy protein. Microparticles are readily prepared from solutions of these proteins through controlled application of heat and high shear conditions facilitative of controlled protein denaturation in a physical and chemical context allowing for the formation of non-aggregated proteinaceous microparticles of the desired size and shape. The particles formed during denaturation are generally spherical in shape and have average diameters in excess of about 0.1 microns. The formation of particles in excess of about 2 microns in diameter and/or formation of aggregates of small particles with aggregate diameters in excess of 2 microns is substantially avoided. Alternatively, the formation of particles or aggregates of particles having volumes in excess of 5.5 cubic microns is avoided while forming substantial numbers of particles having volumes of $5 \times 10^{-4}$ cubic microns or more. The protein denaturing temperatures employed and the duration of heat treatment will vary depending upon the particular protein starting material. In a like manner, the specific high shear conditions including the duration of shear applied to protein solutions will also vary. During the denaturation processing, undenatured proteins in solution interact to form insoluble coagulates, and the controlled application of heat and high shear forces operate to insure formation of non-aggregated particles within the desired size range. Depending upon the specific properties of dissolved commercial protein materials and the properties of non-protein constituents in the solutions of these materials, the application of heat and high shear alone may not optimally allow for the avoidance of oversized particle aggregates. In such situation, one or more materials such as lecithin, xanthan gum, maltodextrins, carageenan, datem esters, alginates, and the like, (referred to as "aggregate blocking agents") can preferably be added to the protein solutions, most preferably prior to heat denaturation processing.

Microcrystalline cellulose. These carbohydrate- or protein-derived microparticles can be partially substituted with a microcrystalline cellulose. Microcrystalline cellulose (sometimes referred to as "cellulose gel") is a nonfibrous form of cellulose that is prepared by partially depolymerizing cellulose obtained as a pulp from fibrous plant material with dilute mineral acid solutions. Following hydrolysis, the hydrocellulose is purified via filtration and the aqueous slurry is spray-dried to form dry, white, odorless, tasteless, porous particles having a broad size distribution. See U.S. Pat. No. 3,023,104, issued Feb. 27, 1962, U.S. Pat. No. 2,978,446 and U.S. Pat. No. 3,141,875 (all of which are incorporated by reference) which disclose methods of preparing microcystalline cellulose. Suitable commercially available microcrystalline celluloses include EMCOCEL®. from Edward Mendell Co., Inc. and Avicel®. from FMC Corp. In addition, microcrystalline cellulose can be produced through a microbial fermentation process. Commercially available microcrystalline cellulose produced by a fermentation process includes PrimaCEL™ from The Nutrasweet Kelco Company.

D. Flavorants

Flavored beverage products of the present invention typically include a flavorant(s) other than those inherently present in the soluble beverage component. The flavored component may be found in either the water-soluble component or the water-insoluble component, or both. Preferably, such flavors are obtained from encapsulated or liquid flavors. These flavors can be natural or artificial in origin. Preferred flavors, or mixtures of flavor, include almond nut, amaretto, anisette, brandy, cappuccino, mint, cinnamon, cinnamon almond, creme de menthe, Grand Mariner®, peppermint stick, pistachio, sambuca, apple, chamomile, cinnamon spice, creme, creme de menthe, vanlilla, French vanilla, Irish creme, Kahlua®, mint, peppermint, lemon, macadamia nut, orange, orange leaf, peach, strawberry, grape, raspberry, cherry, coffee, chocolate, cocoa, mocha and the like, and any mixtures thereof; as well as flavorantlaroma enhancers such as acetaldehyde, herbs, spices, as well as any mixtures thereof.

E. Water

Up to 95%, (generally from about 85 to about 95%) water may be added to the flavored beverage products components of the present invention. Particularly with ready-to-drink formulations, water is added to the composition up to 85%, preferably up to 95%. Water is generally not added to the instant formulations by the manufacturer. Water or other liquid is generally not added to instant beverages except as part of the soluble beverage component, unless used as a dust control processing step.

F. Instant Beverage Products and Method for Making

The preferred method for preparing the instant beverage products of the present invention is to dry blend the water-insoluble and water-soluble components together in a paddle, drum, screw, plough type mixer, or the like to prepare the instant beverage product base for agglomeration.

The preferred method for mraling the flavored instant beverage products of the present invention involves a special blend of emulsifiers as a dissolution agent; said dissolution agent includes lecithin, propylene glycol, ethoxylated mono and diglycerides, and a sucrose fatty acid ester. Said dissolution agent is preferably combined with maltodextrin and water to make a binder solution. The dissolution agent is at about 0.20 to about 0.33%, preferably about 0.27%, dry basis of the finished product. The ethoxylated mono and diglycerides, the lecithin, and the propylene glycol together comprise from about 0.1% to about 0.3%, preferably about 0.2%, dry basis of finished product. The lower sucrose fatty acid esters is from about 0.01% to about 0.04%, preferably about 0.02% dry basis. A binder solution is prepared using the dissolution agent and is sprayed onto a previously mixed instant beverage product base in a high intensity agglomerator, for example, a Schugi type agglomerator. The particle size is increased and the binder solution with the dissolution agent is added as the particles are formed so the wetting agents are thoroughly mixed inside of the newly formed granule.

After the desired particle size is reached, the granule is dried in a fluid bed dryer to remove the excess water used during the agglomeration step. To preserve flavor during the drying, the inlet air temperature is preferably kept below 160° F.

The particle size of the granule is manipulated using standard screening operations to essentially between 20 and 600 microns. It is generally more preferred that a minimum of about 60% of the granules have a size greater than about 212 microns, and a maximum of about 5% have a particle size greater than about 750 microns.

The sized granule is finally combined in an admix with flavor, foaming ingredients, and processing aids to complete the product. It has been found this process provides a more dense product with equal to or better consumer dissolvability than previously known when compared to steam agglomeration, when using the same formulation.

The IBP also has an improved flowability and uniform density as compared to instant coffee products wherein the ingredients are not agglomerated to one another. Furthermore, the IBP has a reduced tendency to segregate during packing and trade handling (e.g., shipping).

Many specialized processes and types of processing equipment have been developed for the agglomeration of particulate solids. (See generally, Pintaufo, N.D., COFFEE SOLUBILIZATION COMMERCIAL PROCESSES AND TECHNIQUES, Noyes Data Corporation, "Agglomeration Techniques", pp. 177–209, (1975)). However, the same basic operating principles are involved in practically all cases. An agglomerating fluid, e.g., oil, liquid water or steam, is uniformly distributed throughout the particles to be agglomerated, causing part or all of the particles to become tacky. The particles are then agitated, allowing the tacky particles to contact and adhere to other particles. Proper control of the amount of agglomerating fluid and the type and time of agitation will provide control over the final size of the agglomerated product.

Applicants have surprisingly discovered that instant beverage products made with high-intensity (e.g., Schugi type) agglomeration using the novel blend of emulsifiers of the current invention provides a consumer rating better than or equal to products made using steam agglomeration, as regards dissolvability and/or mixing. Also, the bulk density of the finished product realized utilizing the current invention is more consumer-preferred because the consumer perceives less product is being used with the more dense high intensity (e.g., Schugi-type) agglomeration product. The Schugi-agglomerated product is about 0.48 g/cc bulk density and the steam agglomeration product is about 0.30 g/cc for similar formulations.

Finally, the Schugi-agglornerated product is more consumer preferred than the steam agglomeration product. The steam agglomeration provides a large, porous, fuzzy looking particle. The process of the current invention provides a granular, more powder like appearance, which is preferred in consumer testing.

The Schugi agglomerator was chosen from the class of high shear mixer/agglomerators because of the agglomeration agitation intensity in the Schugi provides a more dense particle than agglomerators in the low agitation class including steam, low shear mixer, pan, drum, and fluid bed agglomerators. It was found that to obtain equal to better dissolving products as compared to products made utilizing steam agglomeration, the novel dissolution agent of the present invention was needed to use in combination with the Schugi type agglomerator.

It was also found to attempt to achieve higher densities was theoretically possible with extrusion and compaction agglomerators, but these processes destroyed the oil emulsification and encapsulation properties of the creamer in the invention. Also, these products did not dissolve in an acceptable amount of time for the consumer.

A typical Schugi agglomerator procedure involves the following general steps. The dry feed product is fed to the top of a cylindrical chamber which contains a rotating inner shaft with attached blades at high speed (about 1000–4400 RPM). At the point where the dry feed product enters the chamber, a binder solution is introduced by atomizing the solution with a two fluid internal mix nozzle. The dry feed powder and binder solution are violently and intimately mixed causing tacky particle collisions and subsequent particle growth. The sides of the Schugi cylindrical chamber are made of a flexible material, so that during operation a device can periodically squeeze the chamber causing excess build up to dislodge. The tacky particles are then immediately fed to a dryer to remove excess moisture. A fluid bed dryer is preferred. After drying, the particles are sized to the desired range.

The binder solution is made first making a dry premix of the sucrose monoester and maltodextrin. Next, the dry premix is added to the binder water amount and mixed until clear. The binder water is preferably between 150 and 200° F., more preferably about 175° F. Finally, the lecithin, ethoxylated polyglycerides, and propylene glycol are added to the solution and dispersed. As mentioned before, the viscosity of the solution is preferably below 40 cps, more preferably below 20 cps and most preferably below 15 cps.

The binder solution concentration is preferably between 20 and 40% solids more preferably about 30%.

The dry powder feed is fed consistently to the top of the Schugi chamber. The binder solution is fed and atomized (with 2 nozzles) simultaneously in the chamber with the dry feed powder. Typical atomization pressures are 30 psi for the air and, 25 psi for the liquid solution. The atomized stream should most preferably be about 80° F. or higher A key operating variable is liquid loading as a percent of powder through the Schugi. This is quantified by the powder to binder ratio. Preferably this is between 13 and 8, more preferably between 9 and 11, and most preferably about 10. This loading affects the moisture content of the particles, which is usually around 8%.

Another key operating variable is the shaft speed. The Schugi shaft speed is typically operated between 2500 and 4400 RPM, more preferably about 4100 RPM to control particle size, and to a lesser degree control product density.

As the atomized binder and dry feed powder come together in the Schugi chamber, tacky particles collide and particle size is increased. Typically, the mean particle size increases from 190 microns to about 400 microns. The tacky particle immediately flow, by gravity, into a multi-zoned fluid bed dryer. For this application, the inlet air should be below 160° F., and more preferably between 140° F. and 150° F. The approximate mean drying time is about 17 minutes or until the new agglomerates are below 4% moisture, more preferably between 2–3% moisture.

The dry agglomerates are then screened to remove oversized and undersized particles, which should not be more than 25% if the Schugi is set up correctly.

Finally, the sized agglomerates are added to a ribbon blender with foaming creamer, flow aid and flavor and blended to make the finished product. The finished product has a preferred particle size distribution of 0% on 16 mesh, 2–5% on 30 mesh, 20–30% on 40 mesh, 40–55% on 70 mesh, 10–15% on 100 mesh, and 10–15% on pan. The bulk density is a preferably about 0.41 g/cc to 0.50 glcc, more preferably about 0.47 to 0.48 g/cc.

The finished product is further characterized as having an improved flowability compared to a dry mix of the same ingredients. Typically, a dry mix of the starting materials will readily bridge (i.e., particles will pack when attempting to flow through a small opening), whereas the IBP of the present invention will freely flow through such an opening.

Another desirable characteristic of the MBP of the present invention is dissolution. "Dissolution" refers to the time from which an aqueous solution is placed in a receptacle containing an IBP, accompanied by stirring, until the stirring utensil no longer has residue on it and there are no visible clumps of undissolved powder floating in the beverage. Preferably less than about 20 seconds is required for dissolution of 22 g of the IBP in a 400 cc cup of 240 cc of distilled water at a temperature of about 85° C.

The following examples further describe and demonstrate the preferred embodiment,; within the scope of the present invention. The examples are given solely for the purpose of illustration, and are not to be construed as limitations of the present invention since man variations thereof are possible without departing from its spirit and scope.

ANALYTICAL METHODS

The effectiveness of the dissolving agent was judged using a lab method where about 22 g is added to a 400 cc cup containing 240 cc of distilled water at a temperature of about 85° C. The powder is stirred with a teaspoon 10 times to submerge the powder. After the beverage has stopped moving, the specks of undissolved material are counted and recorded. Often the stiinng and speck counting is repeated. Another key measure of the dissolving agent effectiveness is the results from consumer tests to assess consumer's perception regarding mixing and/or dissolving when using the product.

EXAMPLES

The following examples illustrate the novel dissolution agent, novel binder solution made with a special emulsifier blend, and instant beverage products made using said dissolution agent, according to the present invention.

Example 1

A novel binder solution suitable for use in the agglomeration process in the manufacture of an instant beverage product has the following composition:

| | |
|---|---|
| 2.13% | lecithin |
| 0.43% | propylene glycol |
| 0.28% | ethoxylated mono and diglycerides |
| 0.30% | sucrose fatty acid ester |
| 25.36% | maltodextrin |
| 71.50% | water |
| 100.0 | |

Example 2

The dissolution agent of Example 1 is used to prepare into a binder solution as follows:

The binder solution is made first making a dry premix of the sucrose monoester and maltodextrin. Next, the dry premix is added the binder water amount and mixed until clear, The binder water is preferably between 150° F. and 200° F., more preferably about 175° F. Finally, the lecithin, ethoxylated polyglycerides, and propylene glycol are added to the solution and dispersed. As mentioned before, the viscosity of the solution is preferably below 40 cps, more preferably below 20 cps and most preferably below 15 cps.

During the agglomeration process, the binder solution is used as follows:

The binder solution is sprayed onto a previously mixed flavored instant beverage product base in a high intensity agglomerator, for example, a Schugi type agglomerator.

A typical IBP dry mix could be:

| Ingredient | Wt Percent |
|---|---|
| Non-dairy creamer (50% fat) | 39.9 |
| Simplesse ® 100 (microparticulated whey protein) | 8.7 |
| Dipotassium phosphate | 2.4 |
| Carboxy Methyl Cellulose | 1.6 |
| Sucrose | 23.3 |
| Starch | 6.3 |
| Acesulfame K | 0.3 |
| Instant Coffee | 14.5 |
| Silicon dioxide | 1.0 |
| Flavors | 2.0 |

The particle size is increased and the binder solution with the wetting agents is added as the particles are formed so the wetting agents are thoroughly mixed inside of the newly formed granule.

After the desired particle size is reached, the granule is dried in a fluid bed dryer to remove the excess water used during the agglomeration step. To preserve flavor during the drying, the inlet air temperature is preferably kept below 160° F.

The particle size of the granule is manipulated using standard screening operations to essentially between 20 and 600 microns. It is generally more preferred that a minimum of about 70% of the granules have a size greater than about 212 microns, and a maximum of about 5% have a particle size greater than about 600 microns.

The sized granule is finally combined in an admix with flavor, foaming ingredients, and processing aids to complete the product. It has been found this process provides a more dense product with better consumer dissolvability than previously known when compared to steam agglomeration.

The blended product has a bulk density of 0.48 gm/cc. The particle size distribution of the product is 0% on 16 mesh, 2% on 30 mesh, 26% on 40 mesh, 45% on 70 mesh, 14% on 100 mesh, and 13% on Pan.

The product, when placed in a single product blind use test, scored an average of 68 when consumers were asked to rate the "Mixing/Dissolving" when preparing the beverage.

In addition, in a technical test where 22 g of powder is added to 240 cc 85° C. water and stirred resulted in average of 15 specks. When stirred and counted again there were about 4 specks.

Example 3

The dissolvability of an agglomerated IBP of Example 2 is compared to a dry mix IBP of ingredients made from the same ingredients.

The dry mix IBP is made by combining all of the ingredients into a ribbon blender and discharging the mixed finished product. The dry mix has a bulk density of 0.47 g/cc.

The dissolvability of the agglomerated and dry mix products is compared by the consumer test results of the products. As to its "Mixing/Dissolving" aspects, the agglomerate product was preferred by consumers nearly twice as often. The agglomerated product has "Mixing/Dissolving" rating of about 68 and the dry mix rating is about 37.

Example 4

The dissolvability of an agglomerated instant coffee beverage of the present invention in Example 2 is compared to a agglomerated instant coffee beverage using a binder solution of maltodextrin in water.

A binder solution suitable for use in the agglomeration process in the manufacture of an instant beverage product has the following composition:

| | |
|---|---|
| 30% | maltodextrin |
| 70% | water |
| 100.0% | |

The binder solution having the composition above is prepared by dissolving the maltodextrin in about 170F water and is sprayed onto a previously mixed flavored instant beverage product base in a high intensity agglomerator, for example, a Schugi type agglomerator. The particle size is increased and the binder solution with the wetting agents is added as the particles are formed so the wetting agents are thoroughly mixed inside of the newly formed granule.

The binder solution is sprayed onto a previously mixed flavored instant beverage product base in a high intensity agglomerator, for example, a Schugi type agglomerator. The particle size is increased and the binder solution with the dissolving agents is added as the particles are formed so the wetting agents are thoroughly mixed inside of the newly formed granule.

After the desired particle size is reached, the granule is dried in a fluid bed dryer to remove the excess water used during the agglomeration step. To preserve flavor during the drying, the inlet air temperature is preferably kept below 160° F.

The particle size of the granule is manipulated using standard screening operations to essentially between 20 and 600 microns. It is generally more preferred that a minimum of about 60% of the granules have a size greater than about 212 microns, and a maximum of about 2% have a particle size greater than about 600 microns.

The sized granule is finally combined in an admix with flavor, foaming ingredients, and processing aids to complete the product. It has been found this process provides a more dense product with better consumer dissolvability than previously known when compared to steam agglomeration.

The blended product has a bulk density of 0.48 gm/cc. The particle size distribution of the product is 0% on 16 mesh, 2% on 30 mesh, 26% on 40 mesh, 45% on 70 mesh, 14% on 100 mesh, and 13% on Pan.

The dissolvability of the agglomerated product with dissolving agents from Example 2 can be measured by with a consumer test. It has a "Mixing/Dissolving" rating of 68. The dissolvability of the agglomerated product without the dissolving agents has a "Mixing/Dissolving" rating of 59. In addition, the agglomerated product of this example had about 20 specks when dissolved in the lab test.

Example 5

The dissolvability of an agglomerated instant coffee beverage of the present invention in Example 2 is compared to a agglomerated instant coffee beverage using steam agglomeration on an identical dry mix of ingredients.

The dry mix of the instant coffee beverage ingredients is again blended in a ribbon blender in preparation for agglomeration. In a manner similar to the process found in U.S. Pat. No. 5,433,962 (Stipp) the product is steam agglomerated. After sizing to the desired fraction, the product is evaluated for dissolvability.

The dissolvability of the agglomerated product with dissolving agents from Example 2 consumer test preferences regarding mixing is compared to the dissolvability of the steam agglomerated product and/or dissolvability in the agglomerated product made according to the present invention is equal to or better than the steam agglomerated product. In addition, the steam agglomerated product of this example had about 5 specks when dissolved in the lab test.

The steam agglomeration product has excellent dissolving, but its bulk density is only about 0.30 g/cc, whereas the product from Example 2 has a bulk density of about 0.48 g/cc. This translates into the ability to deliver a more dense product with less scoops or teaspoons of finished product. This aspect retains the creamy mouthfeel preferred by consumers, but obtains this with less required dosage.

Example 6

The dissolving agent and processed used of Examples 1 & 2 can used to manufacture additional instant beverage products.

A flavored instant tea product (1000 g.) is prepared from the following ingredients:

| Ingredient | Grams |
| --- | --- |
| Non-dairy creamer (50% fat) | 400 |
| Simplesse ® 100 (microparticulated whey protein) | 150 |
| Sucrose | 278 |
| Starch | 50 |
| Aspartame | 1.0 |
| Acesulfame K | 1.0 |
| Instant Tea | 100 |
| Silicon dioxide | 10 |
| Flavors | 10 |

The dissolvability of the agglomerated product with dissolving agents had about 15 specks when dissolved in the lab test.

What is claimed is:

1. A novel emulsifier blend comprising of from about 50% to about 80% lecithin; from about 3% to about 20% propylene glycol; from about 5% to about 25% ethoxylated mono and diglycerides; and from about 3% to about 20% of a lower polyol fatty acid ester.

2. A novel emulsifier blend comprising of from about 60% to about 70% lecithin; 5% to about 15% propylene glycol; from about 10% to about 20% ethoxylated mono and diglycerides; and from about 5% to about 15% of a sucrose fatty acid ester.

3. A novel binder solution comprising from about 0.5% to about 15% lecithin; from about 0.05% to about 2% propylene glycol; from about 0.12% to about 3% ethoxylated mono and diglycerides; 0.05% to about 2.0% of a lower polyol fatty acid ester; from about 20% to about 40% maltodextrin, corn syrup solids, sucrose, or any mixture thereof; and from about 60% to about 80% water.

4. A novel binder solution comprising from about 1% to about 10% lecithin; 0.1% to about 1.5% propylene glycol; 0.2% to about 2% ethoxylated mono and diglycerides; 0.1% to about 1.5% of a lower polyol fatty acid ester; from about 20% to about 40% maltodextrin, corn syrup solids, sucrose, or any mixture thereof; and from about 60% to about 80% water.

5. A novel dissolution agent according to claim 1 wherein the polyol of the lower polyol fatty acid ester is sucrose.

6. The instant coffee product produced by the process comprising the steps of:
   a) blending a dry feed powder of instant beverage ingredients and the binder solution according to claim 2;
   b) using said binder solution as an agglomerating fluid in a high intensity agglomerator;
   c) sizing and drying the agglomerates; and
   d) adding the sized agglomerates to non-dry ingredients comprising flavors, flow aids or foaming creamers.

7. The instant coffee product of claim 6 wherein from about 1% to about 4% moisture is added during the agglomeration of step a).

8. The instant coffee product of claim 6 wherein the instant coffee product has a bulk density of from about 0.3 gm/cc to about 0.7 gm/cc.

9. The flavored instant coffee of claim 6 wherein the instant coffee product has a wettability of less than about 15 seconds.

10. The flavored instant coffee product of claim 6 wherein the instant coffee product has a dissolution of less than about 10 seconds.

11. The flavored instant coffee product of claim 6 wherein the instant coffee product has a wettability of less than about 5 seconds and a dissolution of less than about 5 seconds.

12. An instant beverage product comprising from about 0.20% to about 0.33% of the dissolution agent according to claim 1.

13. The instant beverage product according to claim 12 comprising from about 0.01% to about 0.04% lower sucrose fatty acid ester.

14. The instant beverage product according to claim 13 wherein from about 0.1% to about 0.3% of the product consists of lecithin, ethoxylated mono and diglycerides and propylene glycol.

15. The instant beverage product produced by the process comprising the steps of:
   a) blending a dry feed powder of instant beverage ingredients and the binder solution according to claim 2;
   b) using said binder solution as an agglomerating fluid in a high intensity agglomerator;
   c) sizing and drying the agglomerates; and d) adding the sized agglomerates to non-dry ingredients comprising flavors, flow aids or foaming creamers.

16. The instant coffee product of claim 15 wherein said instant beverage product is coffee.

17. The instant coffee product of claim 15 wherein said instant beverage product is coffee.

\* \* \* \* \*